(12) United States Patent
Tretter (10) Patent No.: US 7,688,536 B2
(45) Date of Patent: Mar. 30, 2010

(54) VARIABLE POWER WRITE DRIVER CIRCUIT

(75) Inventor: Larry L. Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/752,795

(22) Filed: May 23, 2007

(65) Prior Publication Data

US 2008/0290908 A1  Nov. 27, 2008

(51) Int. Cl.
*G11B 5/02* (2006.01)

(52) U.S. Cl. .................................................. 360/55

(58) Field of Classification Search .............. 360/55, 360/66, 75, 69; 365/226, 229; 327/110, 327/423; 379/413
See application file for complete search history.

(56) References Cited

U.S. PATENT DOCUMENTS

| 3,389,399 | A | * | 6/1968 | Kennedy ...................... 360/90 |
| 3,570,238 | A | * | 3/1971 | Richmond et al. .......... 368/132 |
| 4,939,389 | A | | 7/1990 | Cox et al. |
| 5,134,311 | A | | 7/1992 | Biber et al. |
| 5,479,123 | A | | 12/1995 | Gist et al. |
| 5,500,774 | A | * | 3/1996 | Watanabe et al. ............. 360/46 |
| 5,550,502 | A | * | 8/1996 | Aranovsky ................... 327/423 |
| 5,581,197 | A | | 12/1996 | Motley et al. |
| 5,602,494 | A | | 2/1997 | Sundstrom |
| 5,666,078 | A | | 9/1997 | Lamphier et al. |
| 5,726,946 | A | * | 3/1998 | Yamagata et al. ........... 365/226 |
| 5,959,927 | A | * | 9/1999 | Yamagata et al. ........... 365/229 |
| 6,014,597 | A | * | 1/2000 | Kochanneck ................. 701/22 |
| 6,134,171 | A | * | 10/2000 | Yamagata et al. ........... 365/229 |
| 6,147,520 | A | | 11/2000 | Kothandaraman et al. |
| 6,246,625 | B1 | * | 6/2001 | Yamagata et al. ........... 365/226 |
| 6,341,098 | B2 | * | 1/2002 | Yamagata et al. ........... 365/226 |
| 6,525,984 | B2 | * | 2/2003 | Yamagata et al. ........... 365/226 |
| 6,643,208 | B2 | * | 11/2003 | Yamagata et al. ........... 365/226 |
| 6,815,980 | B2 | | 11/2004 | Kerr |
| 6,947,554 | B2 | * | 9/2005 | Freyman et al. ............. 379/413 |
| 7,151,393 | B2 | * | 12/2006 | Stein et al. .................. 327/110 |
| 2007/0230008 | A1 | * | 10/2007 | Shinomiya et al. ............ 360/66 |
| 2009/0116134 | A1 | * | 5/2009 | Howley et al. ................ 360/71 |

* cited by examiner

*Primary Examiner*—Fred Tzeng
(74) *Attorney, Agent, or Firm*—Hamilton & Terrile, LLP; Stephen A. Terrile (57) ABSTRACT

A storage system (e.g., a magnetic disk system or a magnetic tape system) employing a write head, a write controller and a write driver circuit. In operation, the write head records data on a magnetic media (e.g., a magnetic tape or a magnetic disk) based on a flow of a write current through the write head, and the write driver circuit includes a variable power supply network and a variable power return network driving the write current through the write head based on a selection by the write controller of an operating power mode among a plurality of selectable power modes of the variable power supply network and the variable power return network. Each power mode of the variable power supply network and the variable power return network drives the write current with a different magnitude from the variable power supply network through the write head to the variable power return network.

23 Claims, 14 Drawing Sheets

| | SS1/RS1 | SS2/RS2 | SS3/RS3 | SSn/RSn | $I_W$ |
|---|---|---|---|---|---|
| 1ST POWER MODE (*LOWEST*) | CLOSED | OPEN | OPEN | OPEN | $I_Z$ |
| 2ND POWER MODE | CLOSED | CLOSED | OPEN | OPEN | $2(I_Z)$ |
| 3RD POWER MODE | CLOSED | CLOSED | CLOSED | OPEN | $3(I_Z)$ |
| nTH POWER MODE (*HIGHEST*) | CLOSED | CLOSED | CLOSED | CLOSED | $n(I_Z)$ |

| | IN_1_N (FIG. 6) | IN_2_P (FIG. 7) | S2_ON (FIGS. 6 & 7) | S3_ON (FIGS. 6 & 7) |
|---|---|---|---|---|
| LOW POWER MODE | "1" | "0" | "0" | "0" |
| MEDIUM POWER MODE | "1" | "0" | "1" | "0" |
| HIGH POWER MODE | "1" | "0" | "1" | "1" |

FIG. 8

| | M11 (FIG. 6) | M12 (FIG. 6) | M13 (FIG. 6) | M41 (FIG. 7) | M42 (FIG. 7) | M43 (FIG. 7) | |
|---|---|---|---|---|---|---|---|
| LOW POWER MODE | CONDUCT STATE | NONCON STATE | NONCON STATE | CONDUCT STATE | NONCON STATE | NONCON STATE | $I_W$ |
| MEDIUM POWER MODE | CONDUCT STATE | CONDUCT STATE | NONCON STATE | CONDUCT STATE | CONDUCT STATE | NONCON STATE | $I_Z$ |
| MEDIUM POWER MODE | CONDUCT STATE | CONDUCT STATE | CONDUCT STATE | CONDUCT STATE | CONDUCT STATE | NONCON STATE | $2(I_Z)$ |
| HIGH POWER MODE | CONDUCT STATE | CONDUCT STATE | CONDUCT STATE | CONDUCT STATE | CONDUCT STATE | CONDUCT STATE | $3(I_Z)$ |

VARIABLE POWER WRITE DRIVER CIRCUIT

FIELD OF THE INVENTION

The present invention generally relates to "H" configuration of FET devices within a write driver circuit. The present invention specifically relates to power demands of the write driver circuit that are dependent upon a size of the FET devices.

BACKGROUND OF THE INVENTION

Magnetic tape provides a means for physically storing data. As an archival medium, tape often comprises the only copy of the data. The tape is typically made as thin as practically possible to maximize the length of a tape stored on a tape reel and thereby maximize the amount of data that can be stored on the tape contained in a single cartridge. A tape drive is used to store and retrieve data with respect to the magnetic tape. An example of a tape drive is the IBM TotalStorage Enterprise Tape Drive 3592 manufactured by IBM Corporation. Tape drives are typically used in combination with an automated data storage library. For example, the IBM TotalStorage Enterprise Tape Library 3494 manufactured by IBM Corporation is an automated data storage library that may include one or more tape drives and data storage media for storing data with respect to the tape drives.

Figure 1:
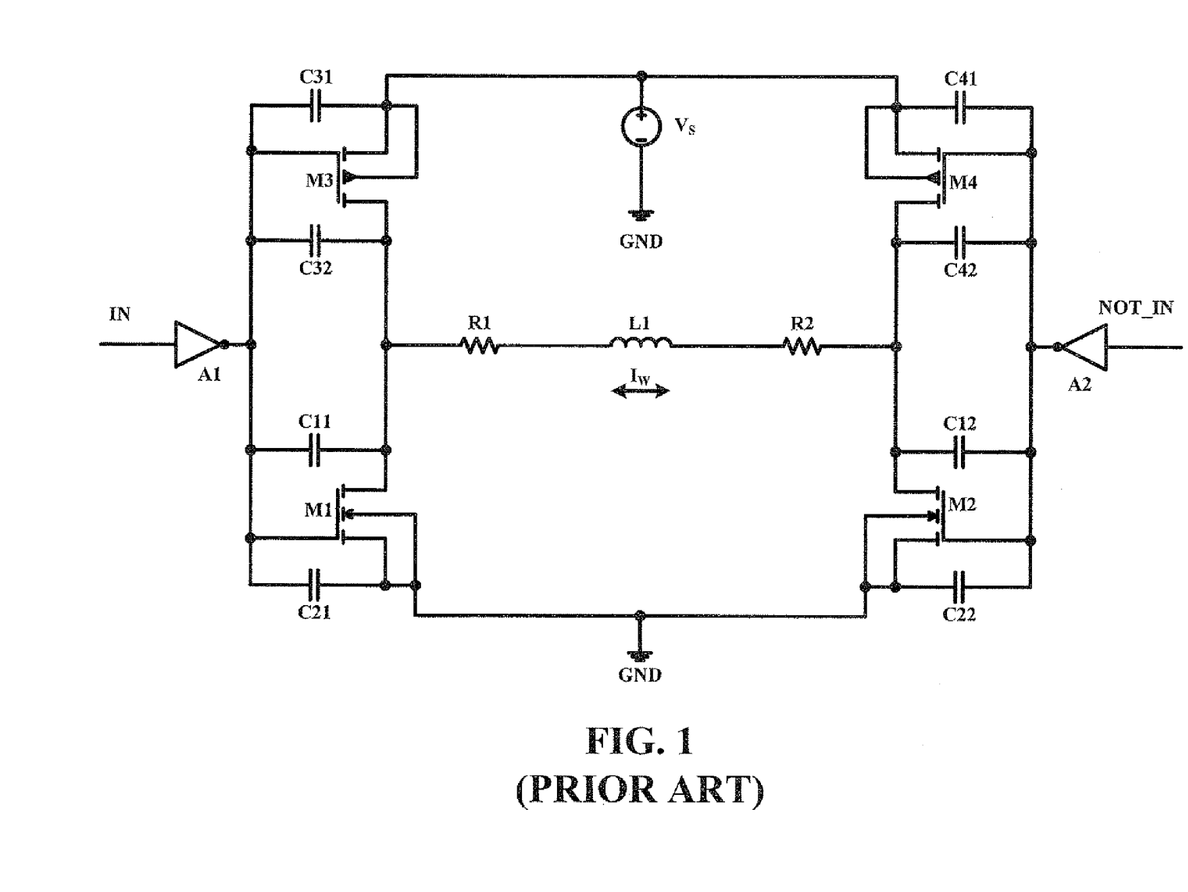
FIGS. 1 and 2 illustrates a respective schematic diagram of a voltage mode H configuration write driver circuit and a current mode H configuration write driver circuit as known in the art.
Figure 2:
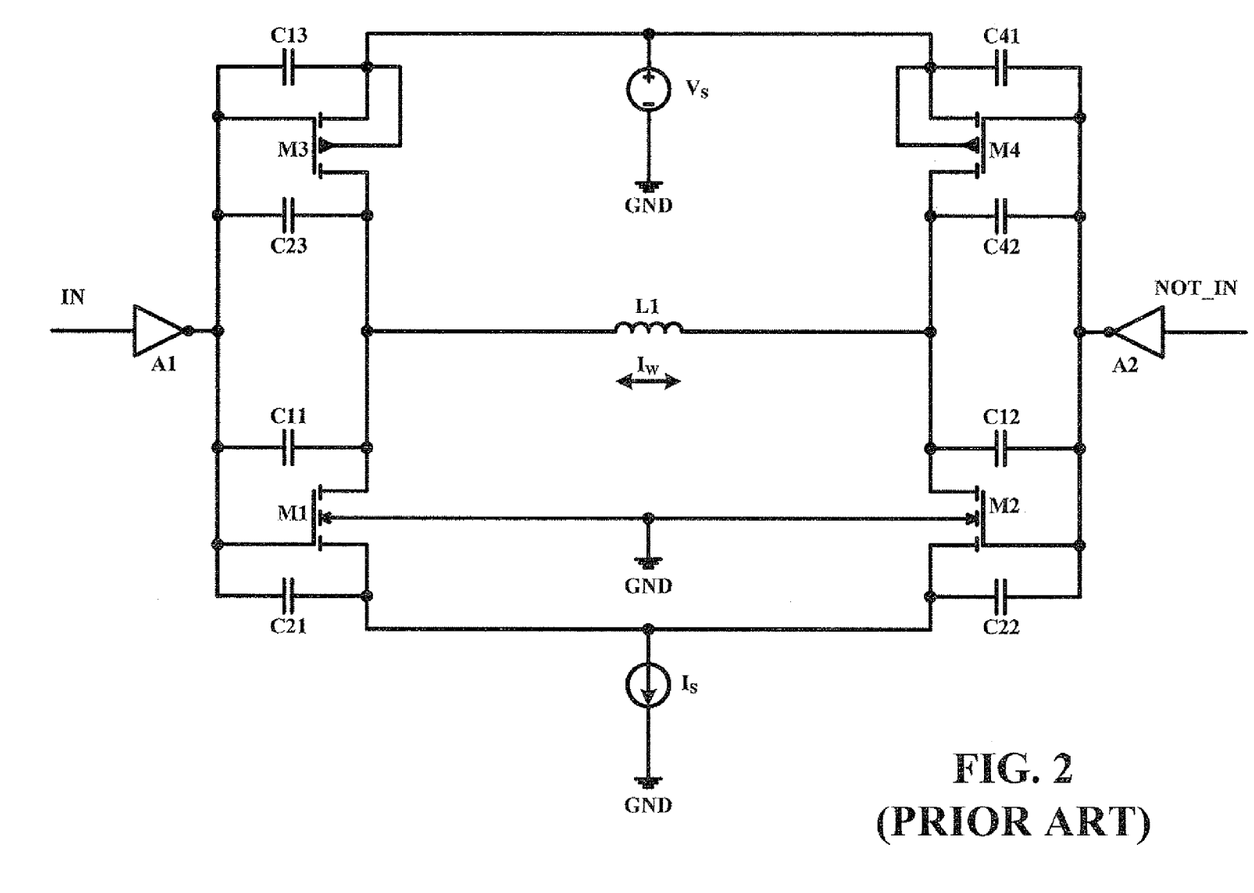

FIGS. 1 and 2 illustrate an exemplary configuration of a known write mechanism of a tape drive employing a "H" configuration of write drivers in the form of FET devices M1-M4 for driving a write current $I_W$ through a write head L1. Under normal write conditions, an AC control signal IN and an AC control signal NOT_IN are applied to respective inverters to logic inverters A1 and A2 to facilitate a bi-directional cyclic flow of a write current $I_W$ through write head L1. Specifically, in a first cycle phase with AC control signal IN being a logic low and AC control signal NOT_IN being a logic high, FETs M2 and M3 are conductive and FETs M1 and M4 are nonconductive whereby write current $I_W$ flows from FET M3 through write head L1 to FET M2. Conversely, in a second cycle phase with AC control signal IN being a logic high and AC control signal NOT_IN being a logic low, FETs M1 and M4 are conductive and FETs M2 and M3 are nonconductive whereby write current $I_W$ flows from FET M4 through write head L1 to FET M1.

For the voltage mode write driver circuit of FIG. 1, a magnitude of write current $I_W$ is dependent upon a voltage source $V_S$ and a pair of resistors R1 and R2 in view of the design of FETs M1-M4 having a low drain-source voltage drop when in a conductive state, and for the current mode write driver circuit of FIG. 2, the magnitude of write current $I_W$ is dependent upon a current source $I_S$ in view of the design of FETs M1-M4 having a low drain-source voltage drop when in a conductive state. Nonetheless, for both write driver circuits, the size of FETs M1-M4 must be selected for the maximum magnitude of write current $I_W$ required for all applications. However, the AC power of AC control signals IN and NOT_IN are affected by the size of FETs M1-M4, as represented by a Z factor equal to a width of a FET divided by a length of a FET, and by the switching frequency at which AC control signals IN and NOT_IN are changing between logic states.

As related to the size of FETs M1-M4, each FET M1-M4 has a respective capacitance C11-C42 that must be charged when switching a FET from being nonconductive to conductive, and must be discharged when switching a FET from being conductive to nonconductive. Each capacitance C11-C42 is proportional to the size of FETs M1-M4. As a result, the total AC power of AC control signals IN and NOT_IN increases with any increase in the size of FETs M1-M4. Consequently, the storage industry is constantly striving to improve upon techniques for maximizing the magnitude of write current $I_W$ required for all applications while minimizing the AC power needed to operate the write driver circuit.

SUMMARY OF THE INVENTION

Various embodiments of the present invention provide a new and unique technique for maximizing the magnitude of write current $I_W$ required for all applications while minimizing the AC power needed to operate the write driver circuit.

A first form of the present invention is a method for operating a storage drive. The method involves a write controller selecting an operating power mode among a plurality of selectable power modes of a variable power supply network and a variable power return network electrically connected to a write head. Each power mode of the variable power supply network and the variable power return network drives a write current with a different magnitude from the variable power supply network through the write head to the variable power return network. The method further involves the write head recording data on a magnetic media (e.g., a magnetic disk or a magnetic tape) based on a flow of the write current through the write head.

A second form of the present invention is a storage drive (e.g., a disk drive or a tape drive) comprising a write head and a write driver circuit. In operation, the write head records data on a magnetic media (e.g., a magnetic disk or a magnetic tape) based on a flow of a write current through the write head, and the write driver circuit includes a variable power supply network and a variable power return network driving the write current through the write bead based on a selection of an operating power mode among a plurality of selectable power modes of the variable power supply network and the variable power return network. Each power mode of the variable power supply network and the variable power return network drives the write current with a different magnitude from the variable power supply network through the write head to the variable power return network.

A third form of the present invention is a storage system (e.g., a disk system or a tape system) comprising a write head, a write controller and a write driver circuit. In operation, the write head records data on a magnetic media (e.g., a magnetic disk or a magnetic tape) based on a flow of a write current through the write head, and the write driver circuit includes a variable power supply network and a variable power return network driving the write current through the write head based on a selection by the write controller of an operating power mode among a plurality of selectable power modes of the variable power supply network and the variable power return network. Each power mode of the variable power supply network and the variable power return network drives the write current with a different magnitude from the variable power supply network through the write head to the variable power return network.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION

Figure 3:
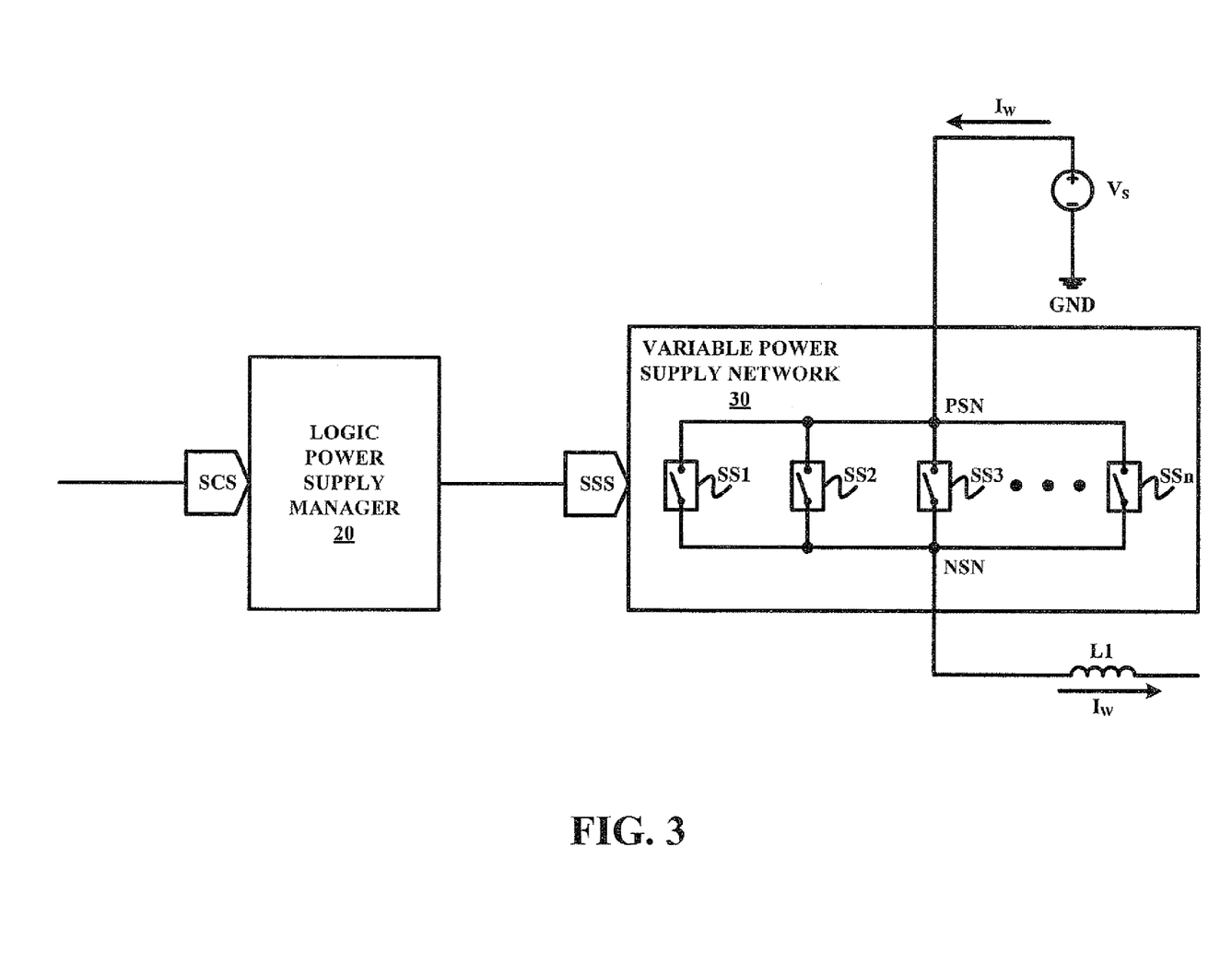
FIG. 3 illustrates a block diagram of one embodiment of a logic supply controller and a variable power supply network of a write driver in accordance with the present invention.

FIG. 3 illustrates a logic power supply manager 20 and a variable power supply network 30 for driving a write current $I_W$ to a write head L1. To this end, variable power supply network 30 includes a "n" number of write drivers in the form of supply electronic switches SS ($n \geq 2$) connected in parallel between a positive supply node PSN and a negative supply node NSN with a voltage source $V_S$ being connected to positive supply node PSN and write head L1 being connected to negative supply node NSN. Based on one or more supply control signals SCS received from an external controller, logic power supply manager 20 utilizes logic components to provide one or more number of supply switching signals SSS to network 30 whereby one or more supply electronic switches SS can be switched between an open state and a closed state (e.g., one or more PFETs being switched between a conductive state and a nonconductive state).

Figure 4:
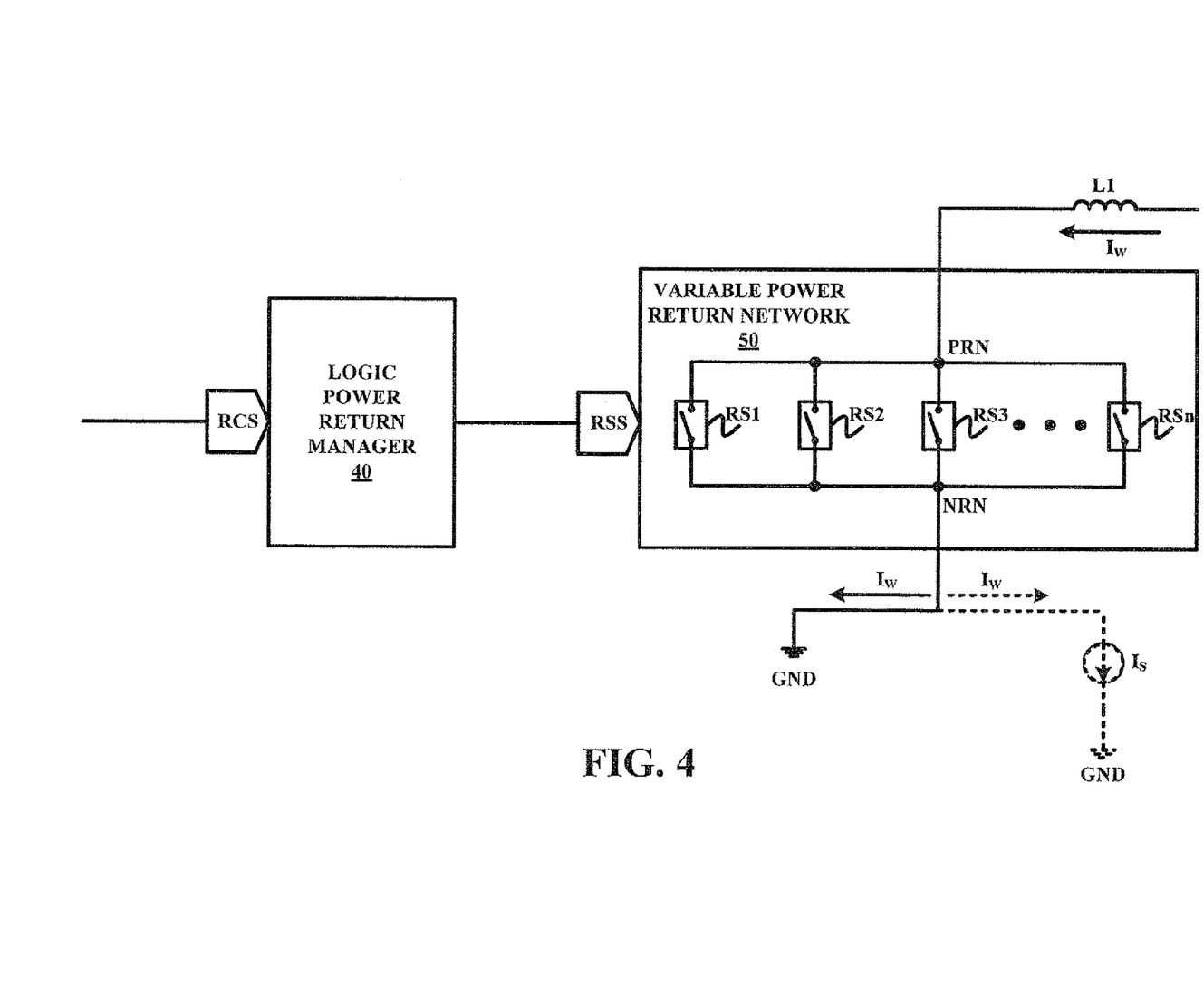
FIG. 4 illustrates a block diagram of one embodiment of a logic return controller and a variable power return network of a write driver in accordance with the present invention.

FIG. 4 illustrates a logic power return manager 40 and a variable power return network 50 for sourcing a write current $I_W$ from write head L1. To this end, variable power return network 50 includes a "n" number of write drivers in the form of return electronic switches RS ($n \geq 2$) connected in parallel between a positive return node PRN and a negative return node NRN with write head L1 being connected to positive return node PRN and a ground GND being connected to negative return node NRN. Alternatively, as indicated by the dashed lines, a current source $I_S$ can be connected to negative return node NRN. Based on one or more return control signals RCS received from an external controller, logic power return manager 40 utilizes logic components to provide one or more return switching signals RSS to network 50 whereby each return electronic switch RS can be switched between an open state and a closed state (e.g., one or more NFETs being switched between a conductive state and a nonconductive state).

Figure 5:
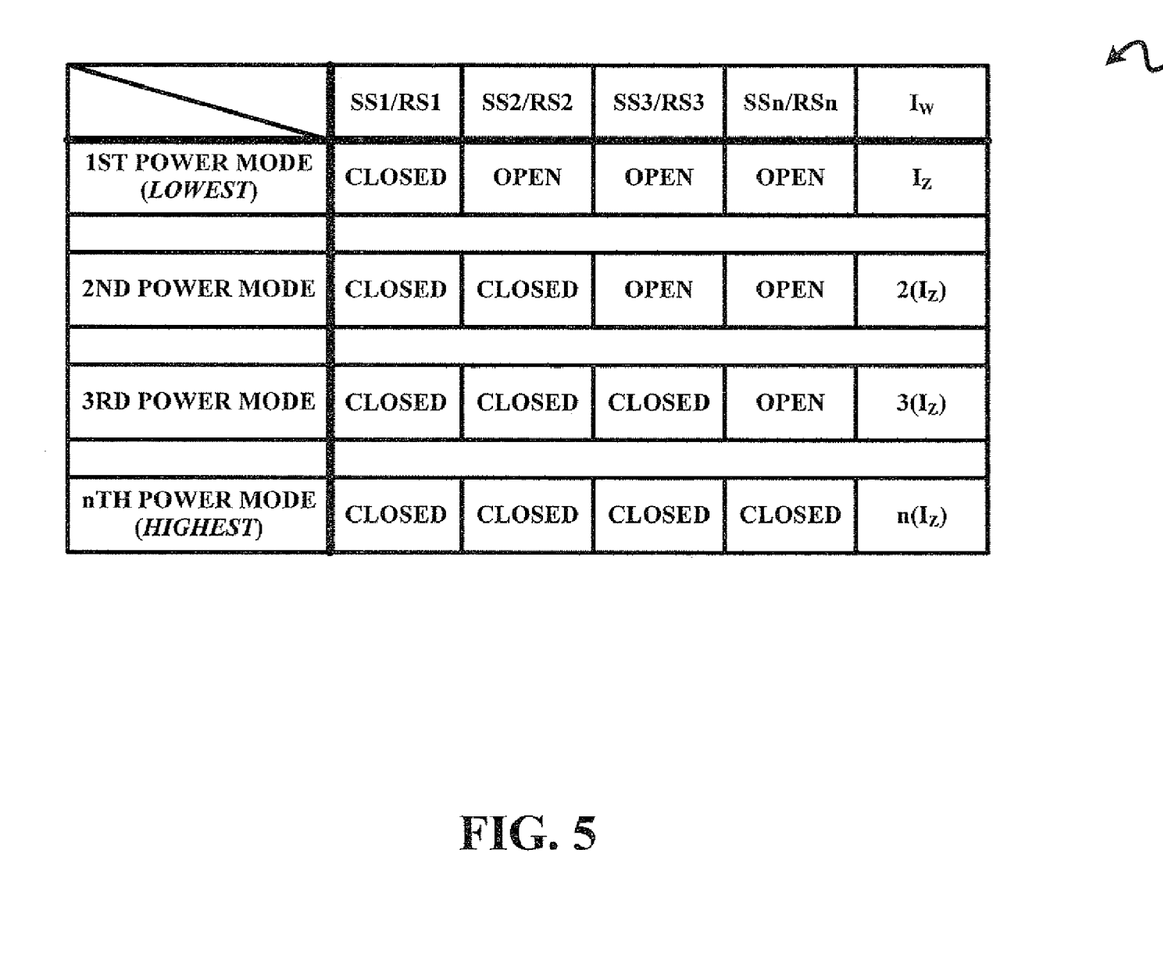
FIG. 5 illustrates a table listing different power modes of the networks illustrated in FIGS. 3 and 4.

Referring to FIGS. 3 and 4, networks 30 and 50 will drive write current $I_W$ through write head L1 based on a selection of an operational power mode among a number power modes as represented by table 60 shown in FIG. 5. Each power mode represents a different switching configuration of electronic switches SS1-SSn and RS1-RSn whereby the control signals SCS and RCS can be utilized to select a desired operating mode, and as shown in FIG. 5, each power mode provides a different magnitude of write current $I_W$ based on its particular switching configuration of electronic switches SS1-SSn and RS1-RSn. Specifically, in view of electronic switches SS1-SSn and RS1-RSn having the same Z factor (e.g., a common Z factor for a n number PFETs and an n number of NFETs), each power mode provides a magnitude n ($I_Z$) as a function of a size of the closed switches among electronic switches SS1-SSn and RS1-RSn.

In practice, there are no limitations or restrictions to the structural configurations of managers 20 and 40 and networks 30 and 50 as shown in FIGS. 3 and 4. To further illustrate an understanding of managers 20 and 40 and networks 30 and 50, FIGS. 6, 7, 10 and 11 illustrate exemplary structural configurations of managers 20 and 40 and networks 30 and 50.

Figure 6:
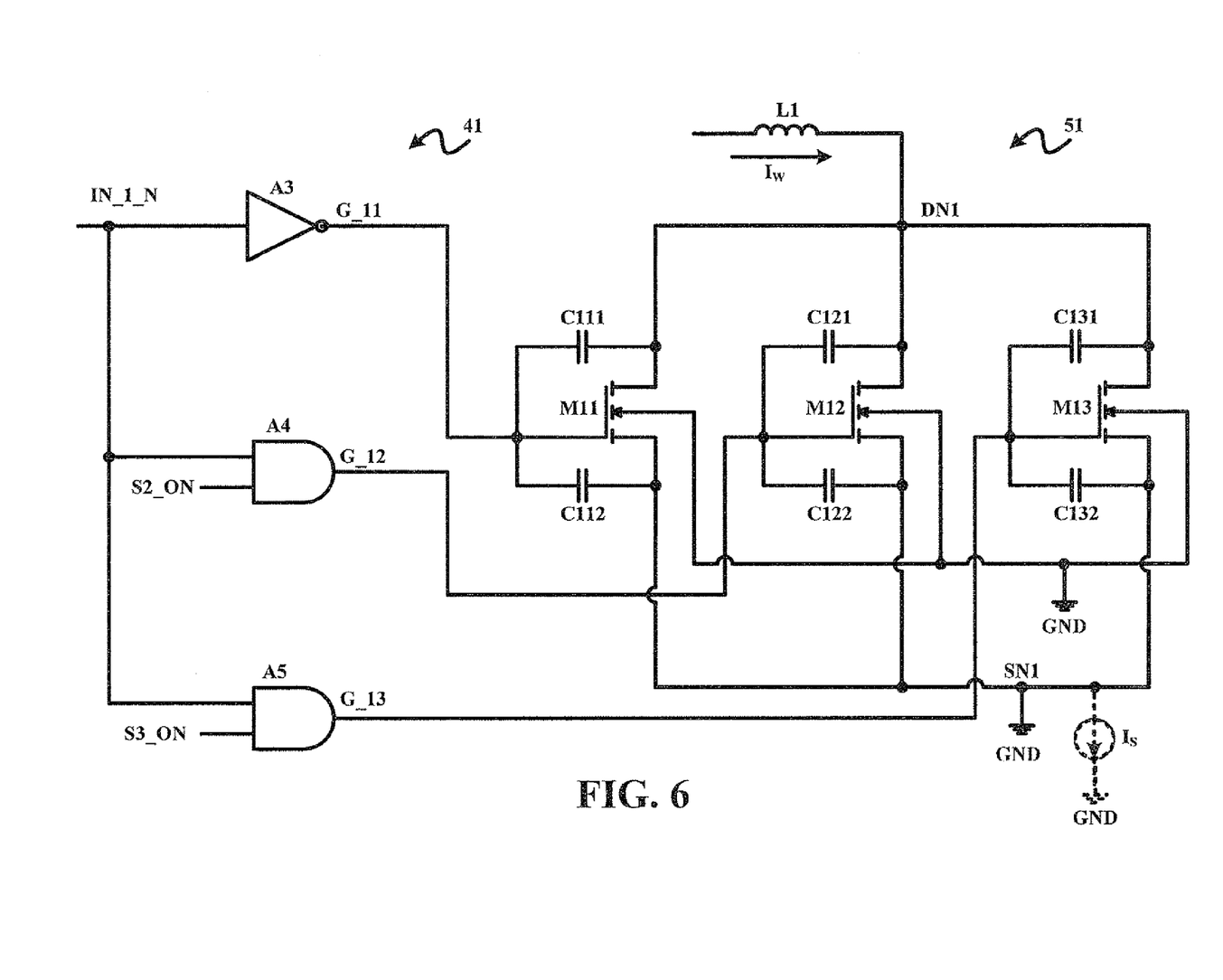
FIG. 6 illustrates a schematic diagram of a first embodiment of a NFET write driver employing a logic supply controller and a variable power supply network in accordance with the present invention.

Referring to FIG. 6, a NFET write driver employs a logic return manager 41 and a variable power return network 51. Manager 41 includes an inverter A3, a two-input AND gate A4 and a two-input AND gate A5. Network 51 includes three (3) NFETs M11-M13 connected in parallel between a drain node DN1 and a source node SN1 with write head L1 being connected to drain node DN1. For a voltage mode, ground GND is connected to source node SN1. Alternatively for a current mode, as indicated by the dashed lines, current source $I_S$ is connected to source node SN1 instead of ground GND. Inverter A3 provides a gate signal G_11 to a gate terminal of a NFET M11 based on an inversion of a control signal IN_1_N into gate signal G_11. AND gate A4 provides a gate signal G_12 to a gate terminal of a NFET M12 based on a Boolean AND function of control signals IN_1_N and S2_ON. AND gate A5 provides a gate signal G_13 to a gate terminal of a NFET M13 based on a Boolean AND function of control signals IN_11_N and S3_ON.

Figure 7:
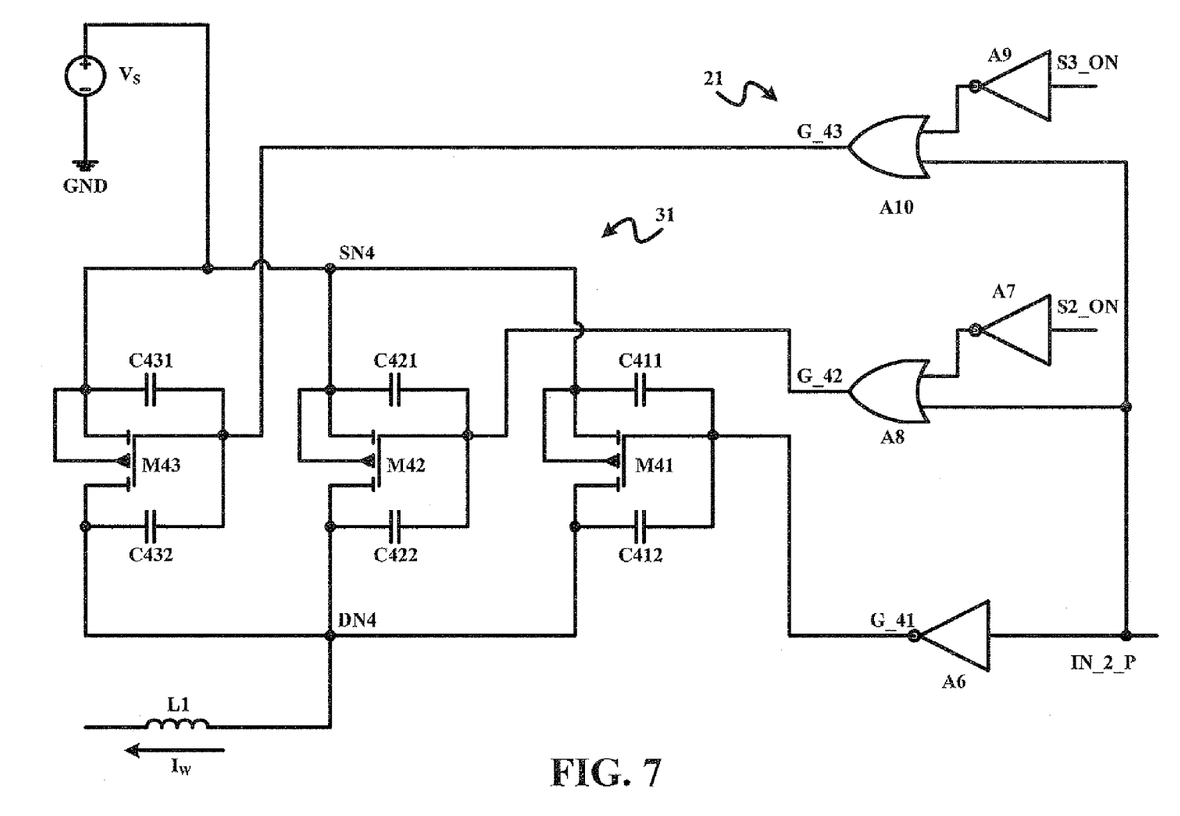
FIG. 7 illustrates a schematic diagram of a first embodiment of a PFET write driver employing a logic return controller and a variable power return network in accordance with the present invention.

Referring to FIG. 7, a PFET write driver employs a logic return manager 21 and a variable power return network 31. Manager 21 includes an inverter A6, an inverter A7, a two-input OR gate A8, an inverter A9 and a two-input OR gate A10. Network 31 includes three (3) PFETs M41-M43 connected in parallel between a source node SN4 and a drain node DN4 with voltage source $V_S$ being connected to source node SN4 and write head L1 being connected to drain node DN4. Inverter A6 provides a gate signal G_41 to a gate terminal of a PFET M43 based on an inversion of a control signal IN_2_P into gate signal G_41. Inverter A7 and OR gate A8 provide a gate signal G_42 to a gate terminal of a PFET M42 based on a Boolean OR function of control signal IN_2_P and an inversion of control signal S2_ON. Inverter A9 and OR gate A10 provide a gate signal G_43 to a gate terminal of a PFET M43 based on a Boolean OR function of control signal IN_2_P and an inversion of control signal S3_ON.

Figure 8:
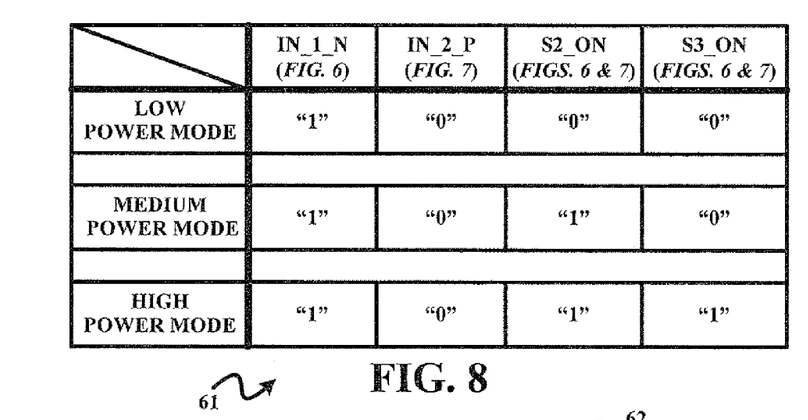
FIGS. 8 and 9 illustrates tables listing different power modes of the NFET write driver and the PFET write driver illustrated in FIGS. 6 and 7.
Figure 9:
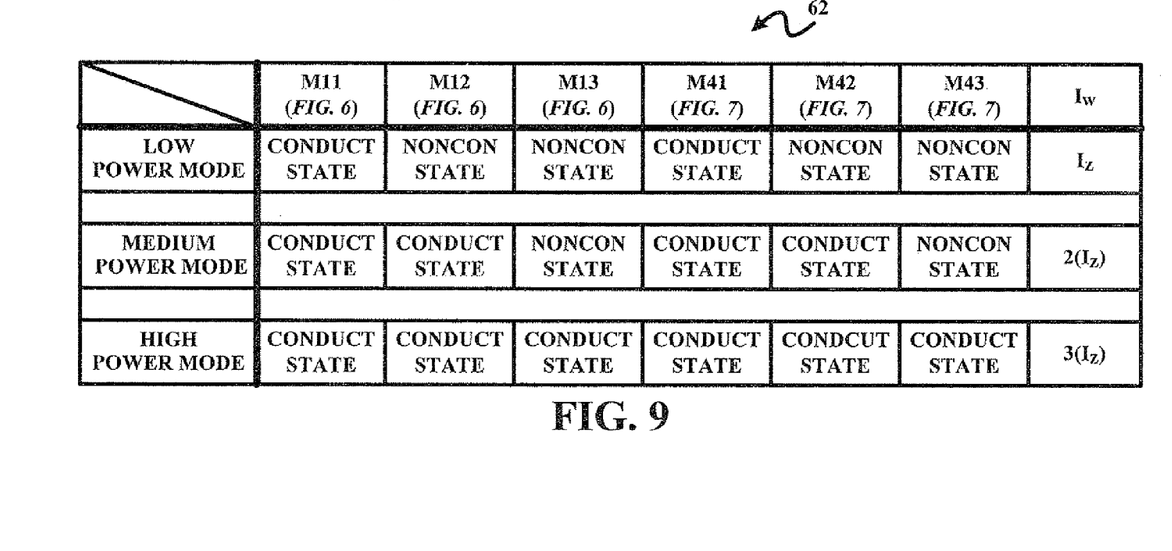

In operation, the NFET write driver of FIG. 6 and PFET write driver of FIG. 7 are switched in unison between a conductive state and a nonconductive state based on a selection of an operational power mode among three (3) power modes via the control signals as represented by power mode tables 61 and 62 shown in respective FIGS. 8 and 9. Each power mode represents a different switching configuration of NFETs M11-M13 and PFETs M41-M43 whereby the control signals IN_1_N, IN_2_P, S2_ON and S3_ON can be utilized to select a desired operating mode as best shown in FIG. 8. As best shown in FIG. 9, each power mode provides a different magnitude of write current $I_W$ based on its particular switching configuration of NFETs M11-M13 and PFETs M41-M43 between a conductive state ("CONDUCT STATE") and a nonconductive state ("NONCON STATE"). Specifically, in view of NFETs M11-M13 and PFETs M41-M43 having the same Z factor, each power mode provides a magnitude $n(I_Z)$ as a function of a common size of the n number of conductive NFETs among NFETs M11-M13 and the n number of conductive PFETs among PFETs M41-M43. More importantly, the common Z factor can be minimized in view of minimizing the capacitance C111-C132 (FIG. 6) and the capacitance C411-C432 (FIG. 7) of respective NFETs M11-M13 and PFETs M41-M43.

Figure 10:
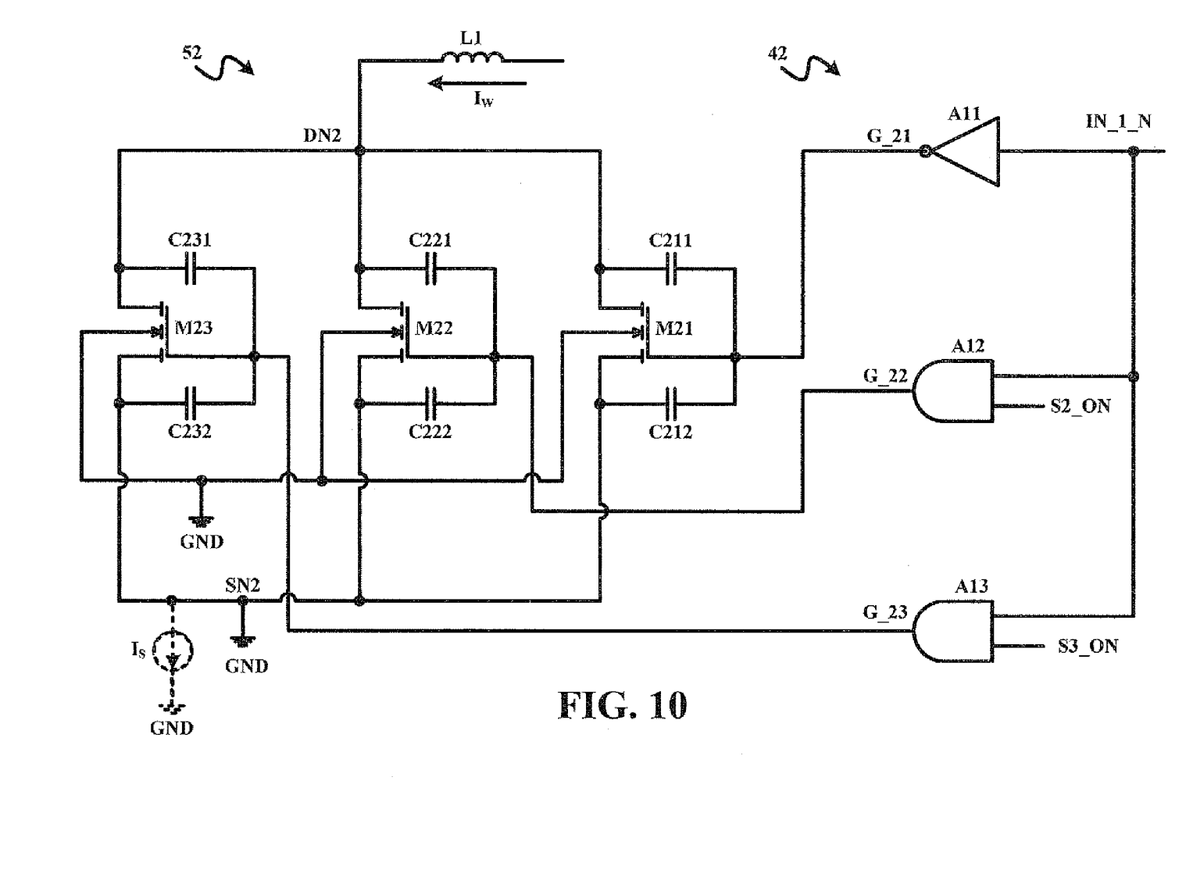
FIG. 10 illustrates a schematic diagram of a second embodiment of a NFET write driver employing a logic supply controller and a variable power supply network in accordance with the present invention.

Referring to FIG. 10, a NFET write driver employs a logic return manager 42 and a variable power return network 52. Manager 42 includes an inverter A11, a two-input AND gate A12 and a two-input AND gate A13. Network 52 includes three (3) NFETs M21-M23 connected in parallel between a drain node DN2 and a source node SN2 with write head L1 being connected to drain node DN2. For a voltage mode, ground GND is connected to source node SN2. Alternatively for a current mode, as indicated by the dashed lines, current source $I_S$ is connected to source node SN2 instead of ground GND. Inverter A11 provides a gate signal G_21 to a gate terminal of a NFET M21 based on an inversion of a control signal IN_2_N into gate signal G_21. AND gate A12 provides a gate signal G_22 to a gate terminal of a NFET M22 based on a Boolean AND function of control signals IN_2_N and S2_ON. AND gate A13 provides a gate signal O_23 to a gate terminal of a NFET M23 based on a Boolean AND function of control signals IN_2_N and S3_ON.

Figure 11:
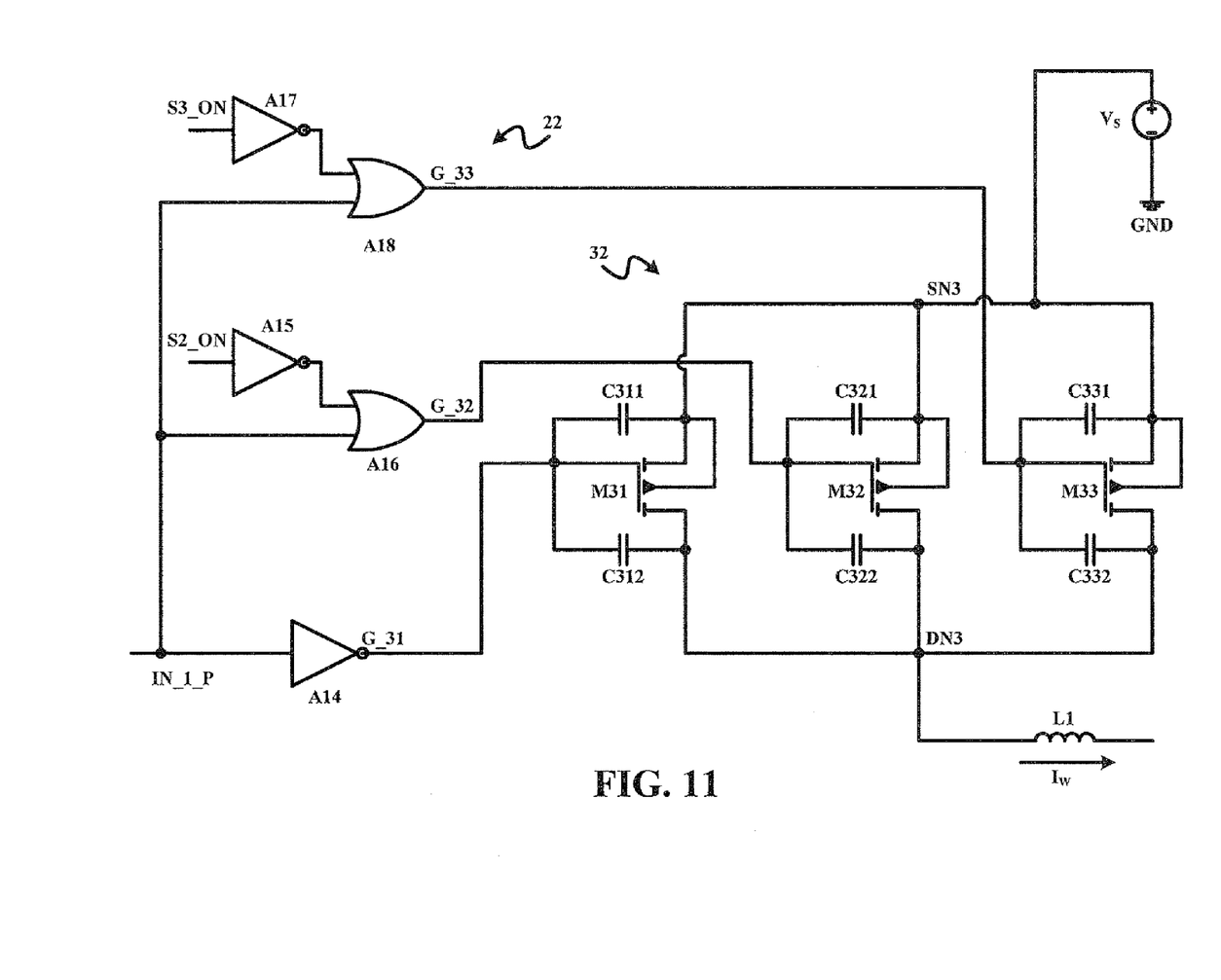
FIG. 11 illustrates a schematic diagram of a second embodiment of a PFET write driver employing a logic return controller and a variable power return network in accordance with the present invention.

Referring to FIG. 11, a PFET write driver employs a logic return manager 22 and a variable power return network 32. Manager 22 includes an inverter A14, an inverter A15, a two-input OR gate A16, an inverter A17 and a two-input OR gate A18. Network 32 includes three (3) PFETs M31-M33 connected in parallel between a source node SN3 and a drain node DN3 with voltage source $V_S$ being connected to source node SN3 and write head L1 being connected to drain node DN3. Inverter A14 provides a gate signal G_31 to a gate terminal of a PFET M31 based on an inversion of a control signal N_1_P into gate signal G_41. Inverter A1 Sand OR gate A16 provide a gate signal G_32 to a gate terminal of a PFET M32 based on a Boolean OR function of control signal IN_1_P and an inversion of control signal S2_ON. Inverter A17 and OR gate A18 provide a gate signal G_33 to a gate terminal of a PFET M33 based on a Boolean OR function of control signal IN_1_P and an inversion of control signal S3_ON.

Figure 12:
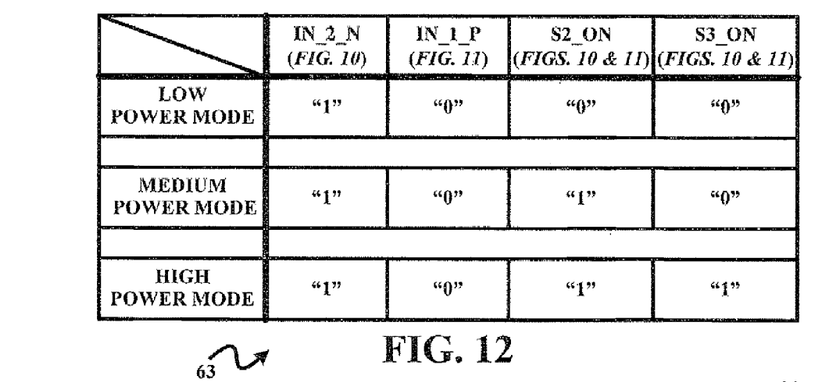
FIGS. 12 and 13 illustrates tables listing different power modes of the NFET write driver and the PFET write driver illustrated in FIGS. 10 and 11.
Figure 13:
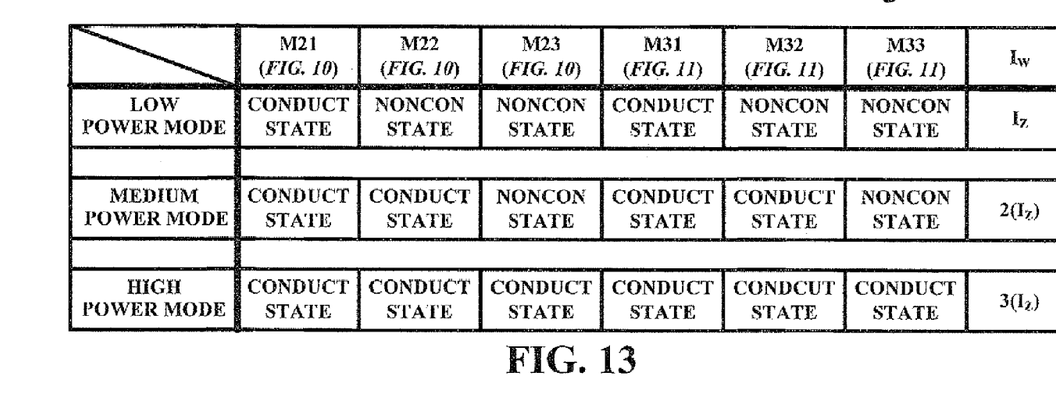

In operation, the NFET write driver of FIG. 10 and PFET write driver of FIG. 11 are switched in unison between a conductive state and a nonconductive state based on a selection of an operational power mode among three (3) power modes via the control signals as represented by power mode tables 63 and 64 shown in respective FIGS. 12 and 13. Each power mode represents a different switching configuration of NFETs M2'-M23 and PFETs M3-M33 whereby the control signals N_2_N, IN_1_P, S2_ON and S3_ON can be utilized to select a desired operating mode as best shown in FIG. 12. As best shown in FIG. 13, each power mode provides a different magnitude of write current $I_W$ based on its particular switching configuration of NFETs M21-M23 and PFETs M31-M33 between a conductive state ("CONDUCT STATE") and a nonconductive state ("NONCON STATE"). Specifically, in view of NFETs M21-M23 and PFETs M31-M33 having the same Z factor, each power mode provides a magnitude $m(I_Z)$ as a function of a common size of the n number of conductive NFETs among switches NFETs M21-M23 and the n number of conductive PFETs among PFETs M31-M33. More importantly, the common Z factor can be minimized in view of minimizing the capacitance C211-C232 (FIG. 10) and the capacitance C311-C332 (FIG. 11) of respective NFETs M21-M23 and PFETs M31-M33.

Figure 14:
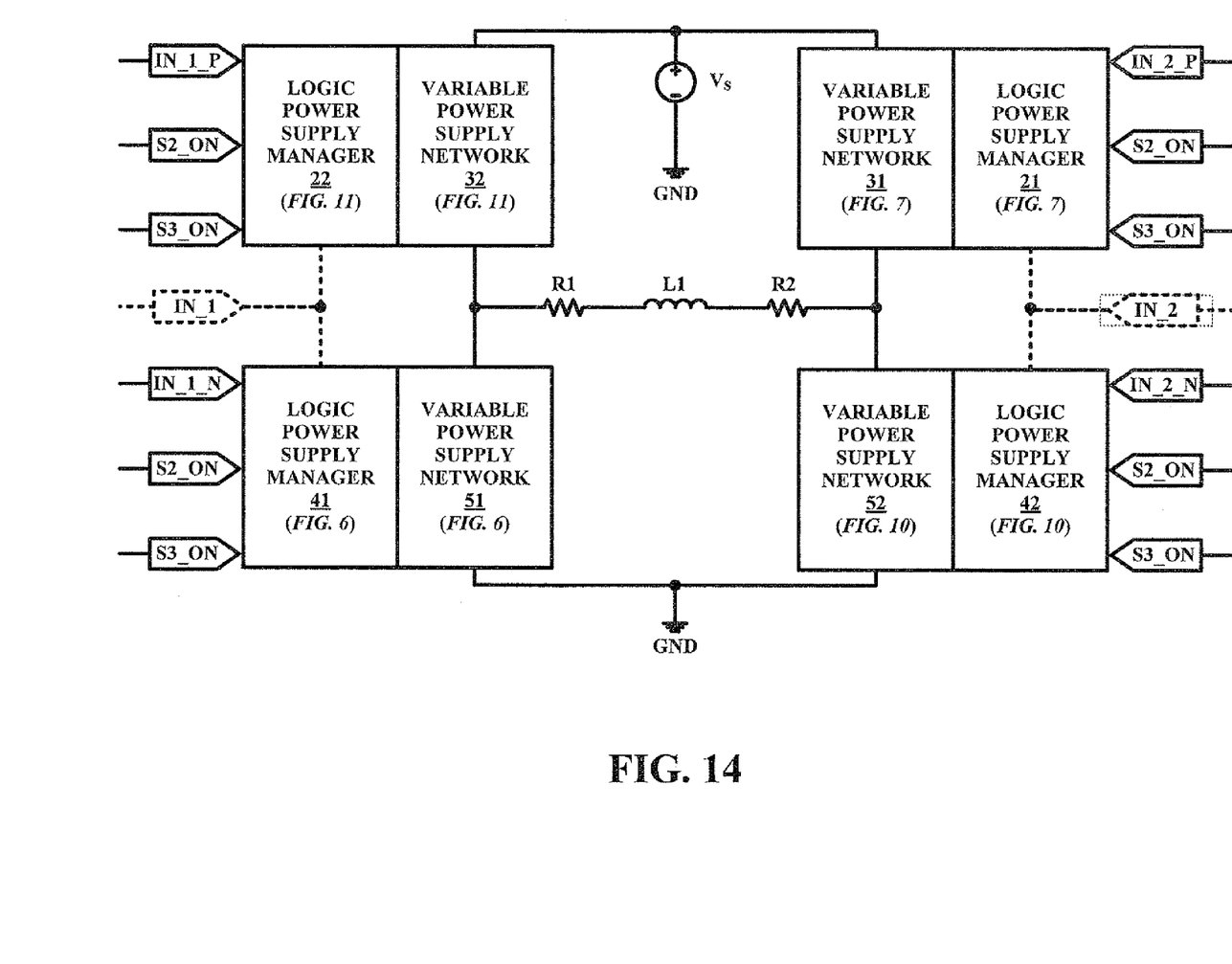
FIG. 14 illustrates a block diagram of one embodiment of a voltage mode "H" configuration write driver circuit in accordance with the present invention.

FIG. 14 illustrates an integration of the NFET write drivers and PFET write drivers shown in FIGS. 6, 7, 10 and 11 into a voltage mode "H" configuration write driver circuit connected between a voltage source VS and ground GND. As shown in FIG. 14, control signals provided from an external controller are used to select a power mode of the write driver circuit as previously described herein in FIGS. 8, 9, 12 and 13. Furthermore, in a CMOS Off Chip Driver embodiment, a control signal IN_1 can be substituted for control signals IN_1_P and IN_1_N and a control signal IN_2 can be substituted for control signals IN$_{13}$ 2_P and IN_2_N.

Referring to FIG. 14, resistors R1 and R2 and inductor L1 may be chosen to optimize the circuit depending on the desired write current and write frequency of the application. Typical values for the embodiment shown in FIG. 14 are as follows. The write clock cycle frequency is in the range of 120-350 MHz. Voltage source $V_S$ is programmable in the range of 3-6 volts in order to change the magnitude of write current $I_W$ by as much as 40-50%. Resistors R1 and R2 have a resistance of 200Ω, and inductor L1 has a typical inductance of 150 nanohenries.

Figure 15:
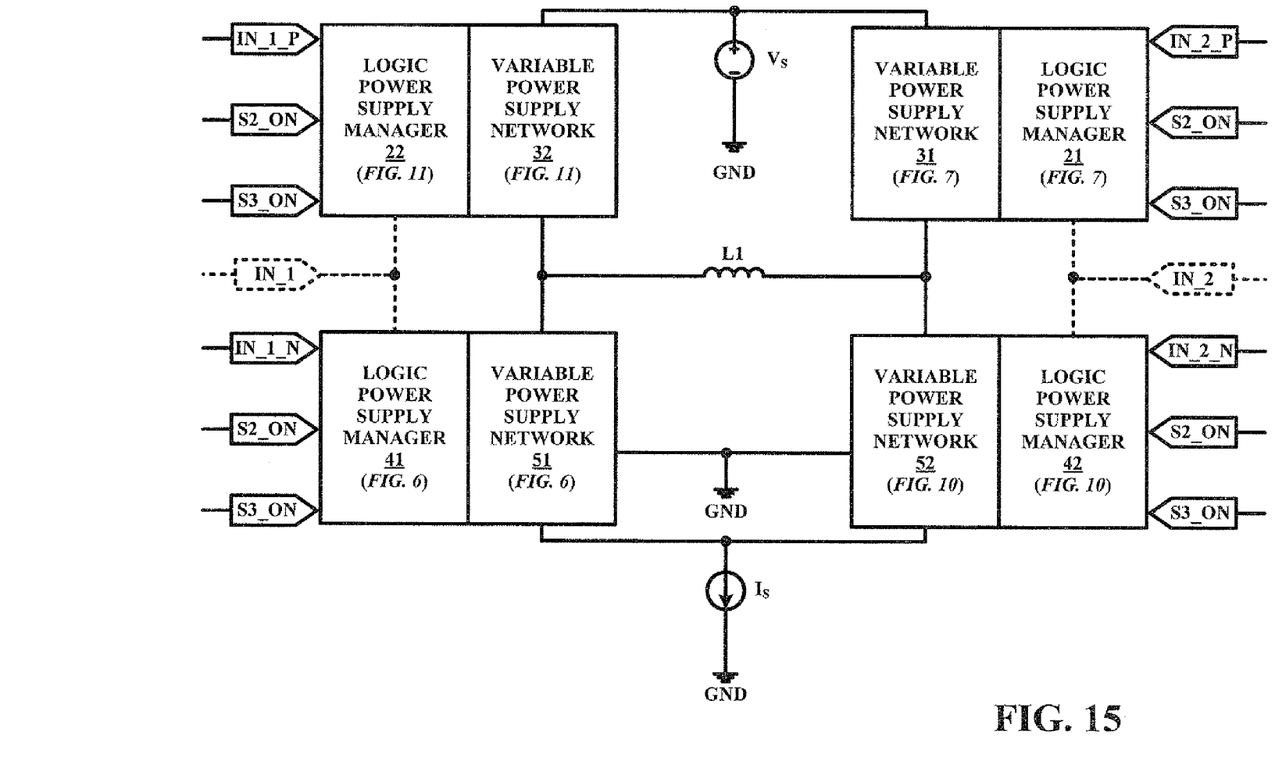
FIG. 15 illustrates a block diagram of one embodiment of a voltage mode "H" configuration write driver circuit in accordance with the present invention.

FIG. 15 illustrates an integration of the NFET write drivers and PFET write drivers shown in FIGS. 6, 7, 10 and 11 into a current mode "H" configuration write driver circuit connected between voltage source $V_S$ and current source $I_S$. As shown in FIG. 15, control signals provided from an external controller are used to select a power mode of the write driver circuit as previously described herein in FIGS. 8, 9, 12 and 13.

Typical values for the embodiment shown in FIG. 15 are as follows. The write clock cycle frequency is in the range of 120-350 MHz. Current source $I_s$ is programmable in a typical range of 10 to 50 milliamps in order to change the magnitude of write current $I_W$, and inductor L1 has a typical inductance of 150 nanohenries.

Figure 16:
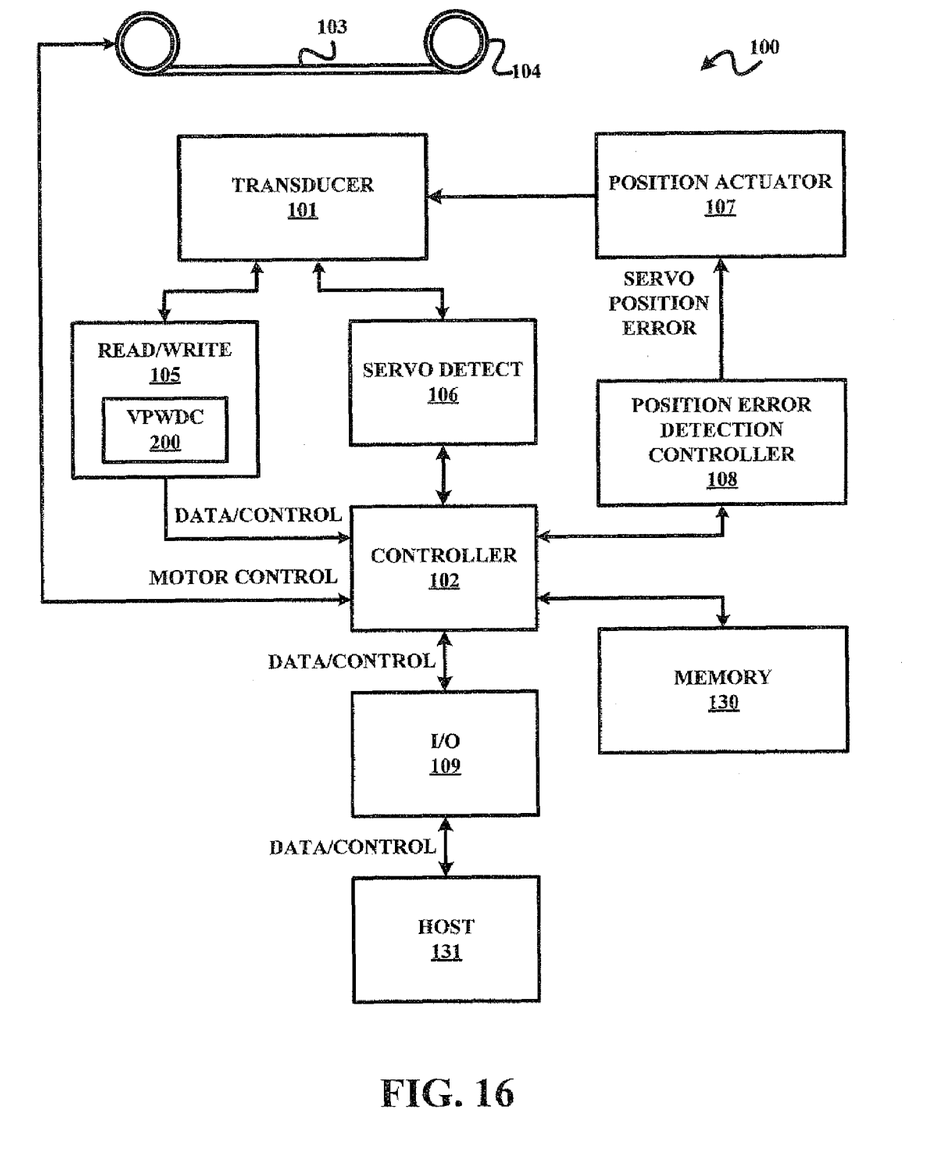
FIG. 16 illustrates a block diagram of one embodiment of a magnetic tape recorder system in accordance with the present invention.

FIG. 16 illustrates an embodiment of a magnetic tape recorder or tape drive system 120 incorporating a write driver circuit ("VPWDC") 200 of the present invention (e.g., the voltage mode driver shown in FIG. 14 or the current mode driver shown in FIG. 15. A tape drive controller 122 provides a motor control signal to rotate tape reels 124 and move magnetic tape 123 across the read/write transducer head 121. Read/write channel 125 transmits read/write signals between the read/write transducer 121 and the controller 122. The data is communicated through I/O channel 129 with host 131. Lateral positioning of the transducer 121 with respect to the tape 123 is accomplished by positioning actuator 127. The lateral repositioning is required to access the various tracks of the tape 123 with the transducer 121. A servo system may be employed for accurate lateral repositioning of the transducer 121. An exemplary servo system includes a servo detector 126 to detect both the track that the head is currently on and whether the head is off center. Controller 122 indicates the track address of a desired new track to position error detection controller 128 for repositioning the head. Servo detector 126 indicates the current track to position error detection controller 128, and the controller provides a servo position error signal to positioning actuator 127 which repositions the transducer 121 to the new track. The servo system also provides track following signals to positioning actuator 127 so that the tracks on tape 123 may be closely spaced. Controller 122 uses logic control signals at Power on Reset to activate detector 200 whereby, upon a detection of an open write condition, controller 122 will report a RAS error to thereby flag a need for drive 200 to be serviced or replaced.

Referring to FIGS. 3-16, those having ordinary skill in the art will appreciate numerous benefits and advantages of the illustrated embodiments of the present invention including, but not limited to, an efficient and effective technique for maximizing the magnitude of write current $I_W$ required for all applications while minimizing the AC power needed to operate the write driver circuit. Furthermore, those having ordinary skill in the art will appreciate how to apply the inventive principles illustrates in FIGS. 3-20 to more or less complex write drivers than the write drivers shown in FIGS. 14 and 15. Additionally, the write drivers of a network may or may not have a common Z factor, although a common Z factor is preferred. In particular, for FETs, the common Z factor of the FETs is defined as a common width of the FETs divided by a common length of the FETs.

Those having ordinary skill in the art may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or segments thereof, it being recognized that the scope of the invention is defined and limited only by the claims which follow.

I claim:

1. A method of operating a storage drive, the method comprising
   selecting an operating power mode among a plurality of selectable power modes of a variable power supply network and a variable power return network via a write controller, each power mode of the variable power supply network and the variable power return network driving a write current with a different magnitude from the variable power supply network through a write head to the variable power return network; and
   recording data on a magnetic media based on the flow of the write current through the write head.

2. The method of claim 1, wherein the selecting the operating power mode among the plurality of selectable power modes of the variable power supply network and the variable power return network includes:
   communicating at least one control supply signal to a logic power supply manager, the at least one control supply signal being representative of the selected operating power mode.

3. The method of claim 2, wherein the selecting the operating power mode among the plurality of selectable power modes of the variable power supply network and the variable power return network further includes:
   the logic power supply manager communicating at least one supply switching signal to the variable power supply network to switch the variable power supply network to a power mode configuration corresponding to the at least one control supply signal.

4. The method of claim 1, wherein the selecting the operating power mode among the plurality of selectable power modes of the variable power supply network and the variable power return network includes:
   communicating at least one control return signal to a logic power return manager, the at least one control return signal being representative of the selected operating power mode.

5. The method of claim 4, wherein the selecting the operating power mode among the plurality of selectable power modes of the variable power supply network and the variable power return network further includes:
   communicating at least one return switching signal to the variable power return network to switch the variable power return network to a power mode configuration corresponding to the at least one control return signal.

6. A storage drive, comprising:
   a write head recording data on a magnetic media based on a flow of a write current through the write head; and
   a write driver circuit including a variable power supply network and a variable power return network driving the write current through the write head based on a selection of an operating power mode among a plurality of selectable power modes of the variable power supply network and the variable power return network,
   wherein each power mode of the variable power supply network and the variable power return network drives the write current with a different magnitude from the variable power supply network through the write head to the variable power return network.

7. The storage device of claim 6, wherein the write driver circuit further includes:
   a logic power supply manager receiving at least one control supply signal representative of the selected operating power mode.

8. The storage device of claim 7, wherein the logical power supply manager communicates at least one supply switching signal to the variable power supply network to switch the variable power supply network to a power mode configuration corresponding to the at least one control supply signal.

9. The storage device of claim 6, wherein the variable power supply network includes:
   a plurality of write drivers connected in parallel between a positive supply node and a negative supply node.

10. The storage device of claim 9, wherein the write driver circuit further includes:
    a logic power supply manager receiving at least one control supply signal representative of the selected operating power mode and communicating a supply switching signal to each electronic switch to switch the variable power supply network to a power mode configuration corresponding to the at least one control supply signal.

11. The storage device of claim 6, wherein the write driver circuit further includes;

a logic power return manager receiving at least one control return signal representative of the selected operating power mode.

12. The storage device of claim 11, wherein the logical power return manager communicates at least one return switching signal to the variable power return network to switch the variable power return network to a power mode configuration corresponding to the at least one control return signal.

13. The storage device of claim 6, wherein the variable power return network includes:
a plurality of write drivers connected in parallel between a positive return node and a negative return node.

14. The storage device of claim 13, wherein the write driver circuit further includes:
a logic power return manager receiving at least one control return signal representative of the selected operating power mode and communicating a return switching signal to each electronic switch to switch the variable power return network to a power mode configuration corresponding to the at least one control return signal.

15. A storage system, comprising:
a write head recording data on a magnetic media based on a flow of a write current through the write head;
a write controller; and
a write driver circuit including a variable power supply network and a variable power return network driving the write current through the write head based on a selection by the write controller of an operating power mode among a plurality of selectable power modes of the variable power supply network and the variable power return network,
wherein each power mode of the variable power supply network and the variable power return network drives the write current with a different magnitude from the variable power supply network through the write head to the variable power return network.

16. The storage system of claim 15, wherein the write driver circuit further includes:
a logic power supply manager receiving at least one control supply signal representative of the selected operating power mode from the write controller.

17. The storage system of claim 16, wherein the logical power supply manager communicates at least one supply switching signal to the variable power supply network to switch the variable power supply network to a power mode configuration corresponding to the at least one control supply signal.

18. The storage system of claim 15, wherein the variable power supply network includes:
a plurality of write drivers connected in parallel between a positive supply node and a negative supply node.

19. The storage system of claim 18, wherein the write driver circuit further includes:
a logic power supply manager receiving at least one control supply signal representative of the selected operating power mode from the write controller and communicating a supply switching signal to each electronic switch to switch the variable power supply network to a power mode configuration corresponding to the at least one control supply signal.

20. The storage system of claim 15, wherein the write driver circuit further includes;
a logic power return manager receiving at least one control return signal representative of the selected operating power mode from the write controller.

21. The storage system of claim 20, wherein the logical power return manager communicates at least one return switching signal to the variable power return network to switch the variable power return network to a power mode configuration corresponding to the at least one control return signal.

22. The storage system of claim 15, wherein the variable power return network includes:
a plurality of write drivers connected in parallel between a positive return node and a negative return node.

23. The storage system of claim 22, wherein the write driver circuit further includes:
a logic power return manager receiving at least one control return signal representative of the selected operating power mode from the write controller and communicating a return switching signal to each electronic switch to switch the variable power return network to a power mode configuration corresponding to the at least one control return signal.

* * * * *